United States Patent
Pai

(10) Patent No.: US 11,977,767 B2
(45) Date of Patent: May 7, 2024

(54) METHOD AND APPARATUS FOR CACHING ADDRESS MAPPING INFORMATION IN FLASH MEMORY BASED STORAGE DEVICE

(71) Applicant: Silicon Motion, Inc., Hsinchu County (TW)

(72) Inventor: Yi-Kai Pai, Taichung (TW)

(73) Assignee: Silicon Motion, Inc., Hsinchu County (TW)

( * ) Notice: Subject to any disclaimer, the term of this patent is extended or adjusted under 35 U.S.C. 154(b) by 143 days.

(21) Appl. No.: 17/693,431

(22) Filed: Mar. 14, 2022

(65) Prior Publication Data

US 2023/0289091 A1 Sep. 14, 2023

(51) Int. Cl.
*G06F 3/06* (2006.01)
*G06F 12/02* (2006.01)

(52) U.S. Cl.
CPC .......... *G06F 3/0656* (2013.01); *G06F 3/0604* (2013.01); *G06F 3/0631* (2013.01); *G06F 3/0659* (2013.01); *G06F 3/0679* (2013.01); *G06F 12/0238* (2013.01); *G06F 2212/7201* (2013.01)

(58) Field of Classification Search
CPC .... G06F 3/0656; G06F 3/0604; G06F 3/0631; G06F 3/0659; G06F 3/0679; G06F 12/0238; G06F 2212/7201
See application file for complete search history.

(56) References Cited

U.S. PATENT DOCUMENTS

| | | | |
|---|---|---|---|
| 4,953,122 A * | 8/1990 | Williams | G06F 3/0601 369/53.17 |
| 11,210,226 B2 | 12/2021 | Yen | |
| 2008/0195802 A1 | 8/2008 | Lee | |
| 2014/0304453 A1* | 10/2014 | Shao | G06F 12/0246 711/103 |
| 2019/0227719 A1* | 7/2019 | Park | G11C 7/1042 |
| 2019/0278519 A1 | 9/2019 | Hou | |
| 2021/0271599 A1 | 9/2021 | Sharovar | |

(Continued)

FOREIGN PATENT DOCUMENTS

| CN | 111897743 A | 11/2020 |
|---|---|---|
| CN | 113892140 A | 1/2022 |

(Continued)

*Primary Examiner* — Charles Rones
*Assistant Examiner* — Hewy H Li
(74) *Attorney, Agent, or Firm* — Winston Hsu

(57) ABSTRACT

A method of caching mapping table for use in a flash memory device having a flash memory controller and a flash memory is provided. The method includes: in response to a host read command, determining whether a group of a logical-to-physical (L2P) required by handling the host read command has been loaded to a DRAM of the flash memory controller; if the required group of the L2P mapping table has not been loaded to the DRAM, loading the required group of the L2P mapping table from the flash memory to a SRAM of the flash memory controller; directly accessing the SRAM to obtain an L2P address associated with the host read command from the required group of the L2P mapping table; and performing a read operation on the flash memory in response to the host read command according to the obtained L2P address.

10 Claims, 9 Drawing Sheets

(56) References Cited

U.S. PATENT DOCUMENTS

| | | | |
|---|---|---|---|
| 2022/0129388 A1* | 4/2022 | Balakrishnan | G11C 11/5628 |
| 2022/0292017 A1* | 9/2022 | Symons | G06F 12/0246 |
| 2023/0062729 A1 | 3/2023 | Tan | |

FOREIGN PATENT DOCUMENTS

| | | |
|---|---|---|
| TW | 201917582 A | 5/2019 |
| TW | 202024918 A | 7/2020 |

* cited by examiner

METHOD AND APPARATUS FOR CACHING ADDRESS MAPPING INFORMATION IN FLASH MEMORY BASED STORAGE DEVICE

BACKGROUND OF THE INVENTION

1. Field of the Invention

The present invention relates to flash memory, and more particularly, to a method and a related flash memory controller for caching address mapping information in flash memory based storage devices.

2. Description of the Prior Art

Typically, a flash memory controller relies on a logical-to-physical (L2P) mapping table to convert a logical address of a host read/write command to a corresponding physical address on a flash memory. The L2P mapping table is usually stored persistently in the flash memory and loaded to a dynamic random access memory (DRAM) included in the flash memory controller for handling the host read/write command. Due to a limited capacity of the DRAM and an immensely large size of the L2P mapping table, each time only a portion (e.g. one or several groups) of the L2P mapping table is loaded to the DRAM when handling host read/write commands. Specifically, a direct memory access (DMA) controller in the flash memory controller would load groups of the L2P mapping table required by the host read/write commands to the DRAM and accordingly notifies a processing unit of the flash memory controller of loading new groups of the L2P mapping table and corresponding DRAM addresses. Then, the processing unit needs to invalidate processing unit's cache lines (e.g. L2 cache) corresponding to the said DRAM addresses and fetch newest information. The cache invalidation may occur frequently when handling host random read/write commands. This is because different portions of L2P mapping table needs to be loaded to the DRAM frequently in response to the random read/write commands. Since the cache invalidation takes a considerably long time (e.g. 2-3 ms), the read/write performance of the flash memory will be significantly deteriorated once the cache invalidation occurs frequently. In view of this, there is a need to provide an innovative method of loading L2P mapping information in a more effective way.

SUMMARY OF THE INVENTION

With this in mind, it is one object of the present invention to provide a method of loading and caching a L2P mapping table in flash memory based storage devices. In embodiments of the present invention, certain L2P mapping information required by host read commands will not be loaded to a DRAM of a flash memory controller. Instead, the L2P mapping information required by the host read commands will be loaded to an SRAM of a flash memory controller, and it will be referenced by the flash memory controller directly accessing the SRAM. This approach will significantly reduce the time consumed by frequently cache invalidations.

According to one embodiment, a method of caching mapping table for use in a flash memory device is provided. The flash memory device includes a flash memory controller and a flash memory, and the method comprises: in response to a host read command, determining whether a group of a logical-to-physical (L2P) required by handling the host read command has been loaded to a dynamic random access memory (DRAM) of the flash memory controller; if the required group of the L2P mapping table has not been loaded to the DRAM, loading the required group of the L2P mapping table from the flash memory to a static random access memory (SRAM) of the flash memory controller; directly accessing the SRAM to obtain an L2P address associated with the host read command from the required group of the L2P mapping table; and performing a read operation on the flash memory in response to the host read command according to the obtained L2P address.

According to one embodiment, a flash memory controller configured to access a flash memory is provided. The flash memory controller comprises: a storage unit, a dynamic random access memory (DRAM); a static random access memory (SRAM) and a processing unit. The storage unit is configured to store information and program codes. The processing unit is operable to execute the program codes to be configured to: in response to a host read command, determine whether a group of a logical-to-physical (L2P) required by handling the host read command has been loaded to the DRAM; if the required group of the L2P mapping table has not been loaded to the DRAM, load the required group of the L2P mapping table from the flash memory to the SRAM; directly access the SRAM to obtain an L2P address associated with the host read command from the required group of the L2P mapping table; and perform a read operation on the flash memory in response to the host read command according to the obtained L2P address.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
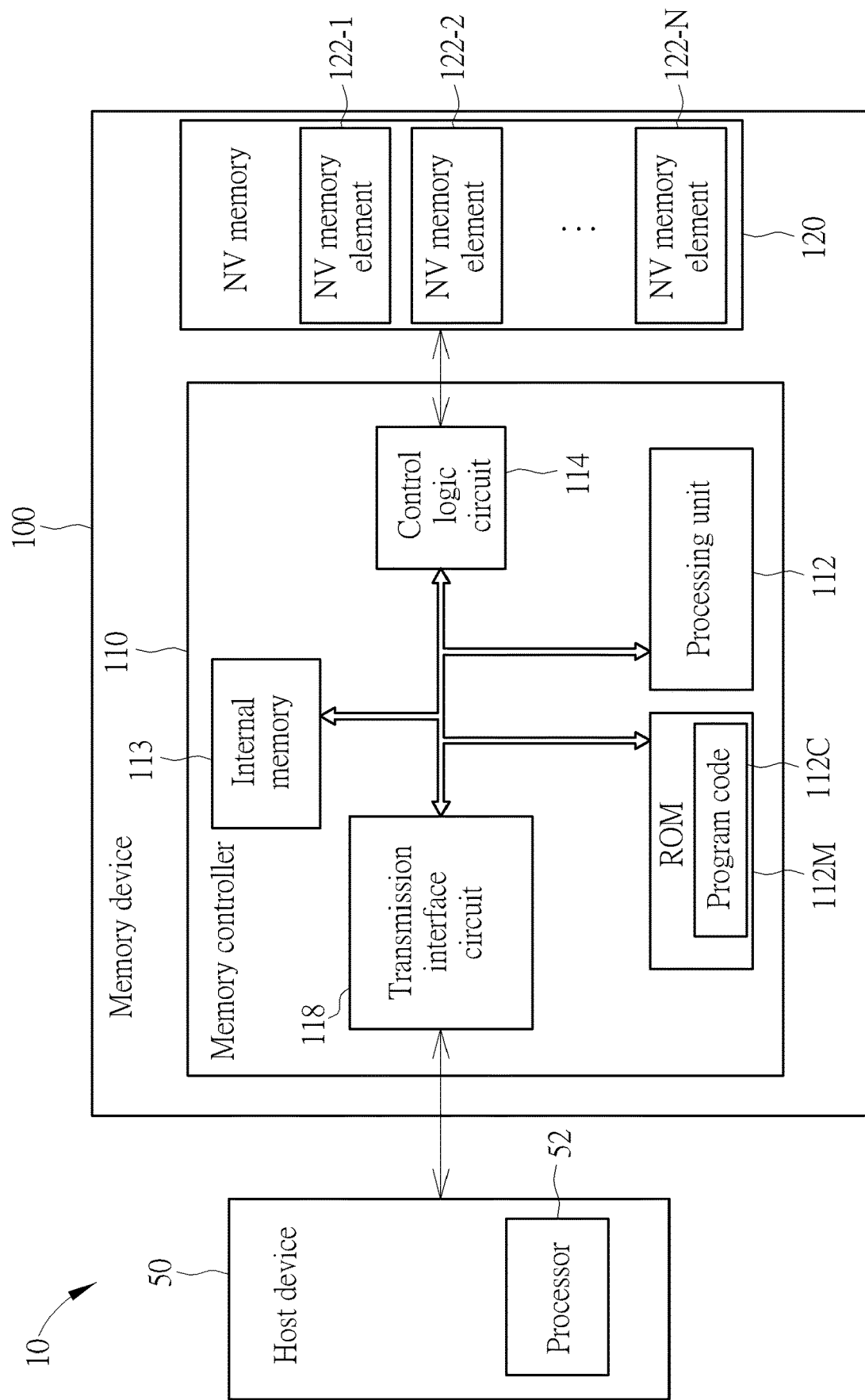
FIG. 1 illustrates architecture of a flash memory device and a flash memory controller according to one embodiment of the present invention.

FIG. 1 is a diagram illustrating an electronic device 10 according to an embodiment of the present invention, where the electronic device 10 comprises a host device 50 and a memory device 100. The host device 50 may comprise: a RAM 54 and at least one processor 52 configured to control operations of the host device 50. Examples of the host device 50 may include, but are not limited to: a smartphone, a tablet computer, a wearable device, a personal computer such as a desktop computer and a laptop computer, an imaging device such as a digital still camera or a video camera a game console, a car navigation system, a printer, a scanner or a server system. Examples of the memory device 100 may include, but are not limited to: a portable memory device (such as a memory card conforming to SD/MMC, CF, MS, XD or UFS specifications), a solid loading state drive (SSD) and various embedded storage device (such as an embedded storage device conforming to UFS or EMMC specifications).

According to various embodiments, the memory device 100 may comprise a controller such as a memory controller 110, and may further comprise a non-volatile (NV) memory 120. The NV memory 120 is configured to store information. The NV memory 120 may comprise at least one NV memory element (e.g. one or more NV memory elements), such as a plurality of NV memory elements 122_1-122_N. For example, the NV memory 120 may be a flash memory, and the NV memory elements 122_1-122_N may be a plurality of flash memory chips or a plurality of flash memory dies, respectively, but the present invention is not limited thereto. In addition, the NV memory 120 may comprise memory cells having a two-dimensional structure or may comprise memory cells having a three-dimensional structure.

As shown in FIG. 1, the memory controller 110 may comprise a processing circuit such as a processing unit 112 (which may comprises multiple processing cores for executing different tasks), a storage component such as a read-only memory (ROM) 112M, a control logic circuit 114, an internal memory 113 and a transmission interface circuit 118, wherein at least one portion (e.g. a portion or all) of these components may be coupled to one another through a bus. The internal memory 113 can be implemented by a random access memory (RAM), for example, the internal memory 113 may comprise a static RAM (SRAM) and a dynamic RAM (DRAM). The internal memory 113 may be configured to provide internal storage space to the memory controller 110, for example, temporarily storing variables and data. In addition, the ROM 112M of this embodiment is configured to store a program code 112C, and the processing unit 112 is configured to execute the program code 112C to control access of the NV memory 120. Alternatively, the program code 112C may be stored in the NV memory 120.

The memory controller 110 controls reading, writing and erasing of the NV memory 120 through a control logic circuit 114. In addition, the memory controller 110 could perform writing of user data based on host commands from the host device 50 and writing of valid data which is read from the NV memory 120 by the garbage collection and or wear-leveling concurrently. The control logic circuit 114 may be further configured to control the NV memory 120 and comprise an Error Correction Code (ECC) circuit (not shown), to perform data protection and/or error correction, but the present invention is not limited thereto. The transmission interface circuit 118 may conform to a specific communications specification (such as Serial Advanced Technology Attachment (SATA) specification, Universal Serial Bus (USB) specification, Peripheral Component Interconnect Express (PCIE) specification, embedded Multi Media Card (eMMC) specification, or Universal Flash Storage (UFS) specification) and may perform communications with the host device 50 according to the specific communications specification.

Typically, the host device 50 may access the memory device 100, indirectly, through transmitting host commands and corresponding logic addresses to the memory controller 110. The memory controller 110 receives the host commands and the logic addresses, and translates the host commands to memory operation commands, and further controls the NV memory 120 with the memory operation commands to perform read, write or erase operations upon memory units or data pages having physical addresses within the NV memory 120, where the physical addresses corresponds to the logic addresses. When the memory controller 110 performs an erase operation on any NV memory element $122\_k$ within the plurality of NV memory elements 122_1-122_N, at least one block of the NV memory element $122\_k$ may be erased. In addition, each block of the NV memory element $122\_k$ may comprise multiple pages, and an access operation (e.g. read or write) may be performed on one or more pages.

Figure 2:
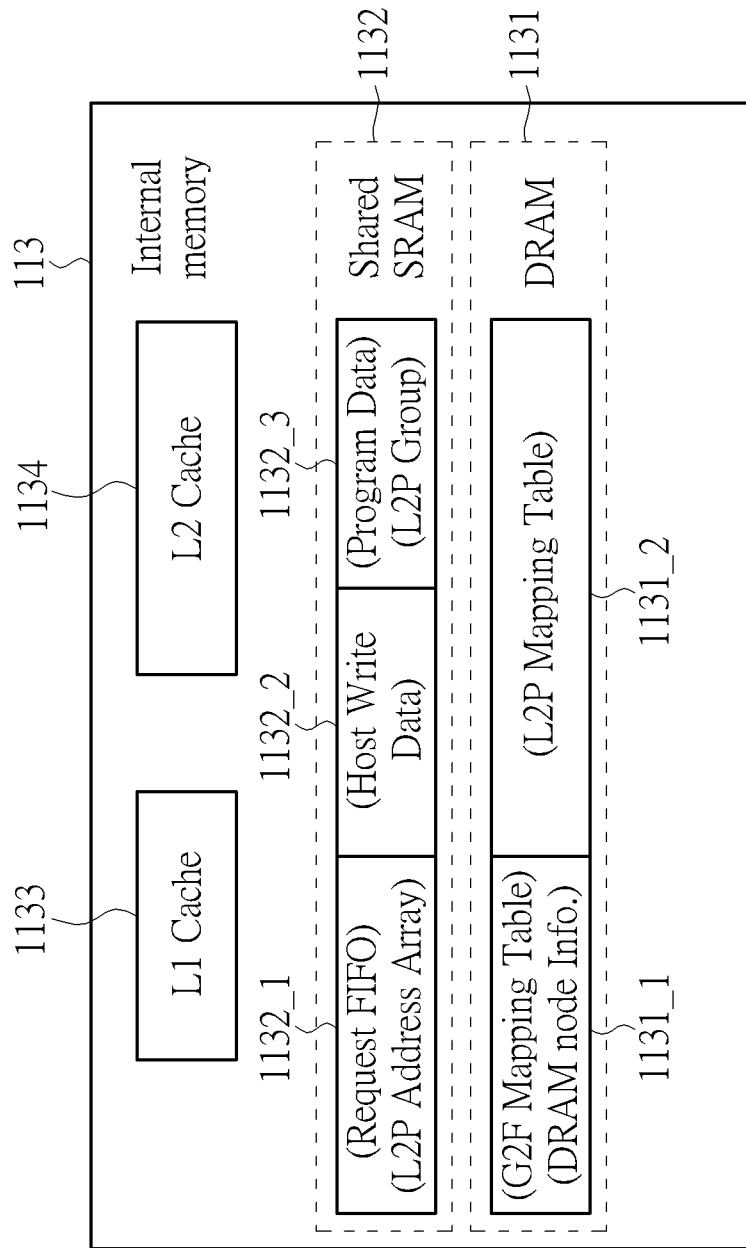
FIG. 2 illustrates architecture of an internal memory of a flash memory controller according to one embodiment of the present invention.

FIG. 2 illustrates architecture of the internal memory 113 according to one embodiment of the present invention. As shown in FIG. 2, the internal memory 113 includes a DRAM 1131, a shared SRAM 1132, an L1 cache 1133, and an L2 cache 1134. Specifically, a first region 1131_1 of the DRAM 1131 is allocated to storing DRAM variables. In one embodiment, the variables stored in the first region 1131_1 may be one or more group-to-flash (G2F) mapping tables and/or DRAM node information (i.e., indicating loading state of each DRAM node). A second region 1131_2 of the DRAM 1131 is operable to store one or more logical-to-physical (L2P) mapping tables.

Furthermore, a first region 1132_1 of the shared SRAM 1132 is allocated to storing variables. For example, a first region 1132_1 can be allocated as a request first-in and first-out buffer (FIFO buffer) 1132F. The request FIFO buffer 1132F can be used by multiple processing cores of the processing unit 112 for data and command exchanging. In addition, the first region 1132_1 can be also allocated to caching an L2P address array. A second region 1132_2 of the shared SRAM 1132 can be allocated as a buffer for caching host write data (i.e., a host write data cache). A third region 1132_3 of the shared SRAM 1132 is allocated as buffer for data to be programed to the NV memory 120 or groups of the L2P mapping tables loaded from the NV memory 120. Moreover, the internal memory 113 may include multiple L1 caches 1133 and multiple L2 caches 1134. Each L1 cache 1133 may be dedicated to one processing core and operable to cache variables that are stored in the first region 1132_1 of the shared SRAM 1131 and/or variables that are stored in the first region 1131_1 of the DRAM 1131, for example, caching information stored in the request FIFO buffer 1132F and L2P addresses in a cached L2P address array. Each L2 cache 1134 may be dedicated to one processing core and operable to cache variables that are stored in the first region 1132_1 of the shared SRAM 1131, for example, caching L2P values associated with the host read/write command.

In general, the host device 50 may provide host read/write command with a logical block address (LBA) to the memory controller 110 through the transmission interface circuit 118 to indicate a location for data to be read from or written into the NV memory 120. However, in order to optimize the data access efficiency, data with continuous LBAs are distributed across different physical regions of the NV memory 120. The L2P mapping table is therefore utilized to indicate which location in the NV memory 120 data of each LBA is physically stored in. The L2P mapping table stores information regarding which location in the NV memory 120 data of each logical address is physically stored in, and the information is placed in the order of the logical storage addresses. The logical storage addresses may be represented by LBAs, and each LBA is associated with a fixed-length of physical storage space, such as 256K, 512K or 1024K bytes.

Moreover, the L2P mapping table is persistently stored in the NV memory 120. When the memory controller 110 intends to handles a host read/write command, the L2P mapping table will be loaded to the internal memory 113 for improving the efficiency of address translation. However, as the L2P mapping table may need space up to 1G bytes (depending on the size of the NV memory 120), it is immensely large for the internal memory 113. Thus, the L2P mapping table would be divided into multiple groups, and only a portion of the groups of the L2P mapping table will be loaded each time the memory controller 110 performs the host read/write command. In an example, each group may contain 1024 L2P entries, where each L2P entry contains a logical address and its corresponding physical address. In the following, the terms "L2P value" and "L2P address" are intended to describe information indicating physical locations in the NV memory 120 that corresponds to the host read/write command or physical locations in the internal memory 113 that data are temporally stored in.

Figure 3:
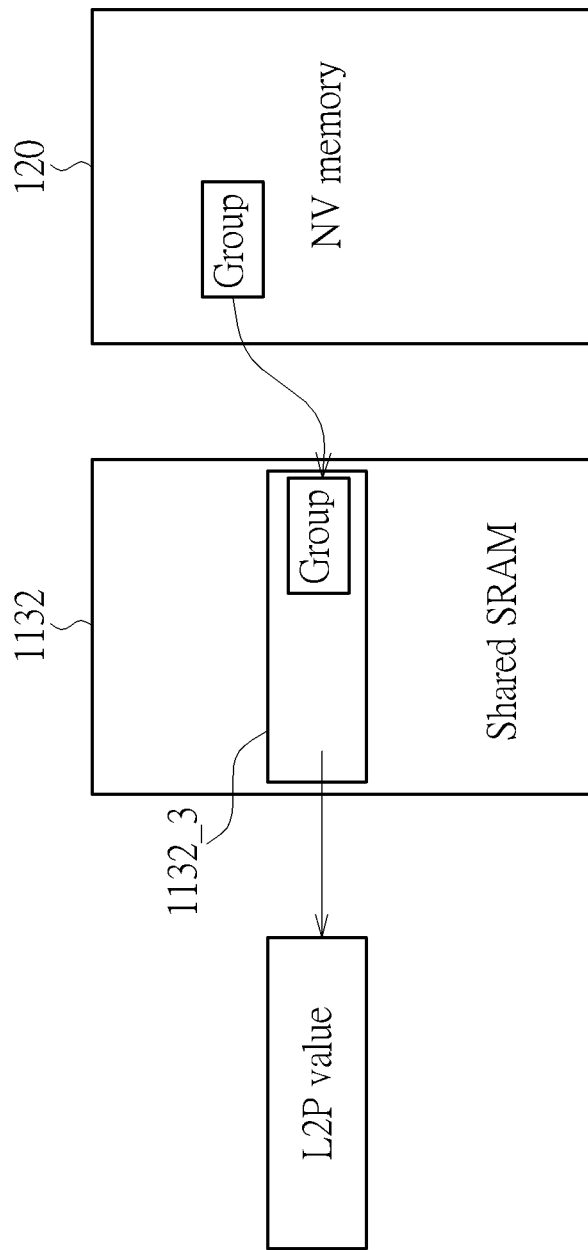
FIG. 3 illustrates how to cache a group of a logical-to-physical mapping table according to one embodiment of the present invention.

In some embodiments of the present invention, upon receipt of a LBA of the host read command, the memory controller 110 would check whether a group of the L2P mapping table corresponding to the LBA has been loaded to the internal memory 113. If yes, the memory controller 110 would perform a L2P address translation by referencing the loaded group of the L2P mapping table and accordingly perform the read/write operation (through the control logic circuit 114) on the NV memory 120. If not, the memory controller 110 will load the group of the L2P mapping table corresponding to the LBA to the shared SRAM 1132 and directly access the SRAM 1132 to obtain an L2P address required by the host read command. Please refer to FIG. 3 for better understandings. As illustrated in FIG. 3, groups of the L2P mapping table may be stored in storage elements of the NV memory 120. If a group of the L2P mapping table corresponding to the LBA of the host read/write command has not been loaded to the internal memory 113 yet, the group will be loaded to the third region 1132_3 of the shared SRAM 1132 first. The processing unit 112 will directly access an L2P entry to obtain the LBA value required by the host read command.

Figure 4:
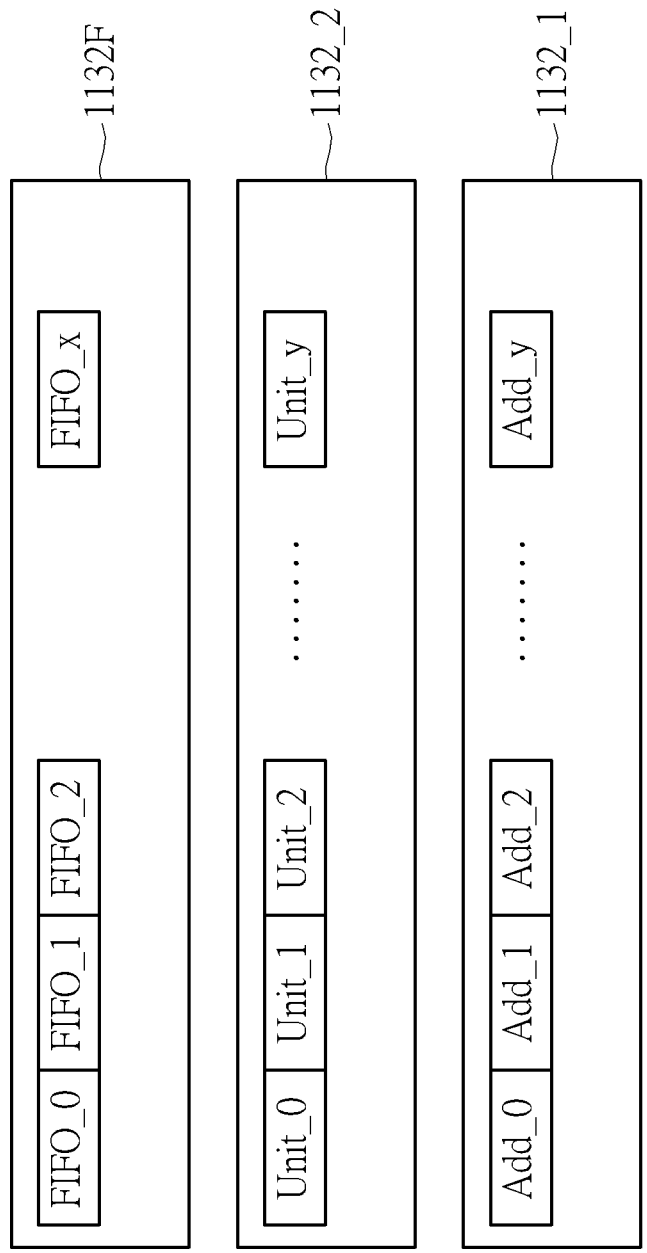
FIG. 4 illustrates how to cache a group of a logical-to-physical mapping table according to another embodiment of the present invention.

In some embodiments of the present invention, groups of the L2P mapping table may have been loaded to the DRAM 1131. In response to host read/write command, a node index indicating which memory element (e.g. a memory node) of the DRAM 1131 a group is stored in will be obtained by checking a group-to-flash (G2F) mapping table. As shown by FIG. 4, obtained node indexes will be recorded in storage elements FIFO buffer_0-FIFO buffer_x of the request FIFO buffer 1132F. To handle a host read/write command, the processing unit 112 would access an L2P value associated with an LBA of the host read command directly by referencing the node indexes recorded in the request FIFO buffer 1132F without repeatedly checking the G2F mapping table. Additionally, when handling a host write command, the processing unit 112 uses the first region 1132_1 of the shared SRAM 1132 to store a L2P address array. As illustrated, data Unit_0-Unit_y of the host write command(s) will be cached in a host write cache which is physically positioned in the second region 1132_2 of the shared SRAM 1132. The L2P address array, which is stored in the first region 1132_1 of the shared SRAM 1132, will be used to cache L2P addresses Addr_0-Addr_y respectively corresponding to the data of the host write command. As the data of the host write command (hereinafter as host write data) may be moved between different memories of the internal memory 113, the L2P addresses Addr_0-Addr_y of the host write data Unit_0-Unit_y needs to be updated frequently to reflect the newest physical location. Therefore, caching and updating the L2P addresses Addr_0-Addr_y of the host write data Unit_0-Unit_y in the L2P address array would significantly save more time than updating and modifying the L2P mapping table since it does need to check the G2F mapping table.

Figure 5:
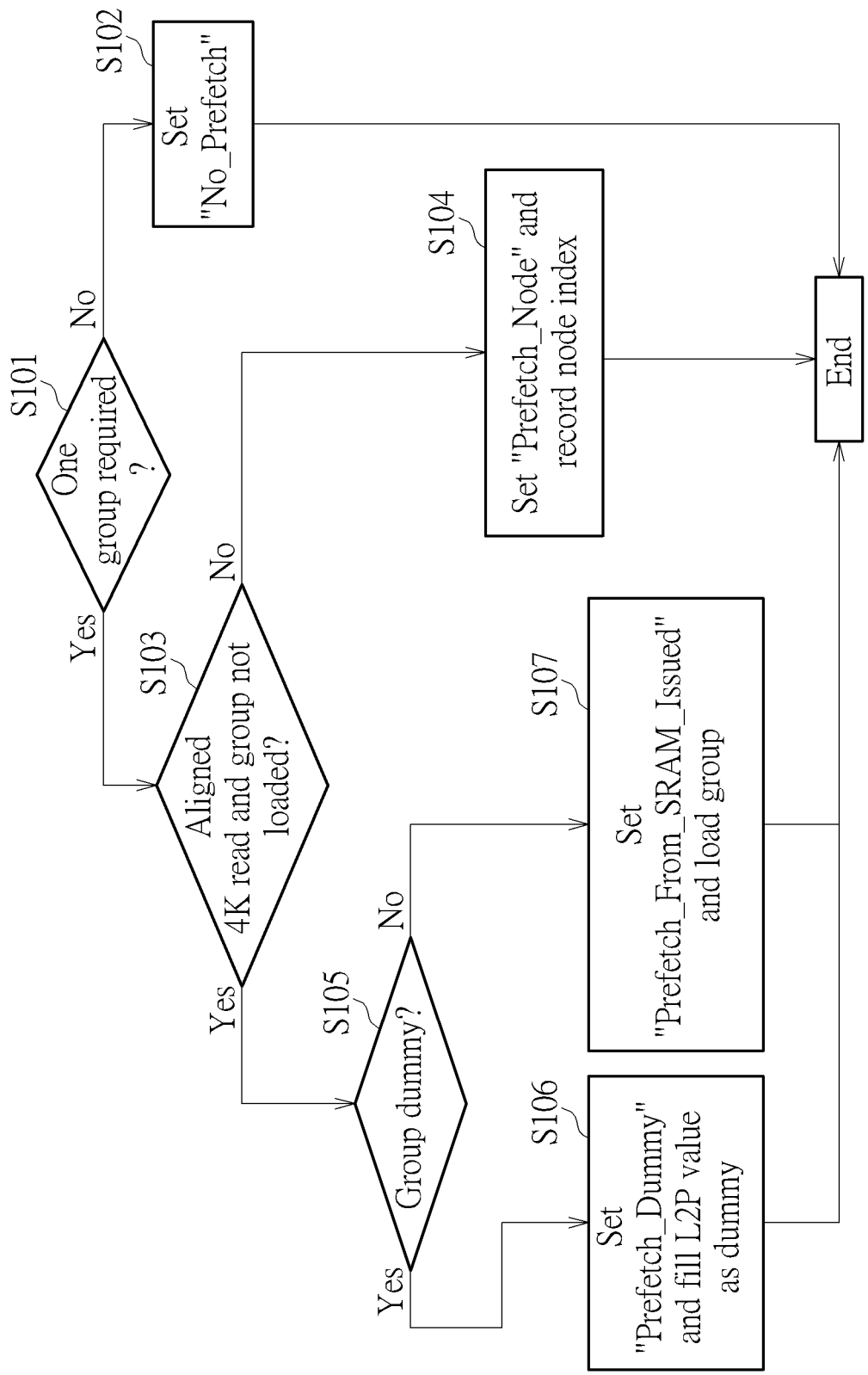
FIG. 5 illustrates a preloading phase for handling a host read/write command according to one embodiment of the present invention.

Embodiments of the present invention performs operations during three phases for handling a host read/write command from the host device 50, which include a preloading phase, a loading state checking phase and a command serving phase. FIG. 5 illustrates a flow chart of the preloading phase according to one embodiment of the present invention. During the preloading phase, one or more groups of the L2P mapping table required by a host read/write command will be loaded to and cached in the internal memory 113. As illustrated, the flow starts at step S101, where it is determined whether a host read/write command from the host device 50 requires only one group of the L2P mapping table for address translation. If no, the flow goes to step S102 and then ends. At step S102, a loading state in the request FIFO buffer 1132F is set as "No_Prefectch", which means more than one groups are required to be loaded for handling the host read/write commands. In such situation, multiple groups will be loaded to the second region 1131_2 of the DRAM 1131 instead of being directly loaded to the third region 1132_3 of the shared SRAM 1132 as shown by FIG. 3. If the host read/write command requires only one group to be loaded, the flow goes to step S103. At step S103, it is determined whether the host read/write command is an aligned 4K read command and the required only group has not been loaded to the second region 1131_2 of the DRAM 1131. This will be achievable by checking the G2F mapping table, which indicates data of each group is on either the internal memory 113 or the NV memory 120, and also indicates the data of the group is on which memory element (e.g. a memory node) of the second region 1131_2 of the DRAM 1131.

If check result of step S103 is no, the flow goes to step S104 and. At step S104, as it may mean the required group is stored in the second region 1131_2 of the DRAM 1131, and thus a node index indicating the required group is on which node (i.e., storage element) of the DRAM 1131 will be obtained by referencing the G2F mapping table. The obtained node index will be recorded to elements of the request FIFO buffer 1132F (e.g. FIFO_0-FIFO_x), and the loading state in the request FIFO buffer 1132F is set as "Prefectch_Node". In addition, the flow may goes to step S104 if the host command is not an aligned 4K read command but the required group has not been loaded to the second region 1131_2 of the DRAM 1131. In such condition, a command will be issued to load the required group from the NV memory 120 to the second region 1131_2 of the DRAM 1131 as well as record the node index to the request FIFO buffer 1132F and set loading state in the request FIFO buffer 1132F is set as "Prefectch_Node".

On the other hand, if the determination result of step S103 is yes, the flow goes to step S105. At step S105, the G2F mapping table will be checked again to determine whether the required only one group is dummy. This is achievable by checking the required only one group is on which location of the NV memory 120. If the required only one group is not on the NV memory 120, it is determined that the required only one group is dummy, and the flow goes to step S106. At step S106, the loading state in the request FIFO buffer 1132F is set as "Prefetch_Dummy" and a corresponding L2P value (i.e., the physical address of the NV memory 120 corresponding to the logic address of the host read command) in the request FIFO buffer 1132 is filled as dummy. If the determination result of step S105 is no, it means the required only one group is on the NV memory 120 and the flow goes to step S107. At step S107, the loading state in the request FIFO buffer 1132F is set as "Prefetch_From_SRAM_Issued" and a command for loading the required only one group from the NV memory 120 to the third region 1132_3 of the shared SRAM 1132 will be issued. In some embodiments, the task of loading the required only one group from the NV memory 120 to the third region 1132_3 may be taken over by another processing core of the processing unit 112. Once the task of loading the required only one group from the NV memory 120 to the third region 1132_3 of the SRAM 1132 is finished, the loading state in the request FIFO buffer 1132F will be set as "Prefetch_From_SRAM_Finished"

Figure 6:
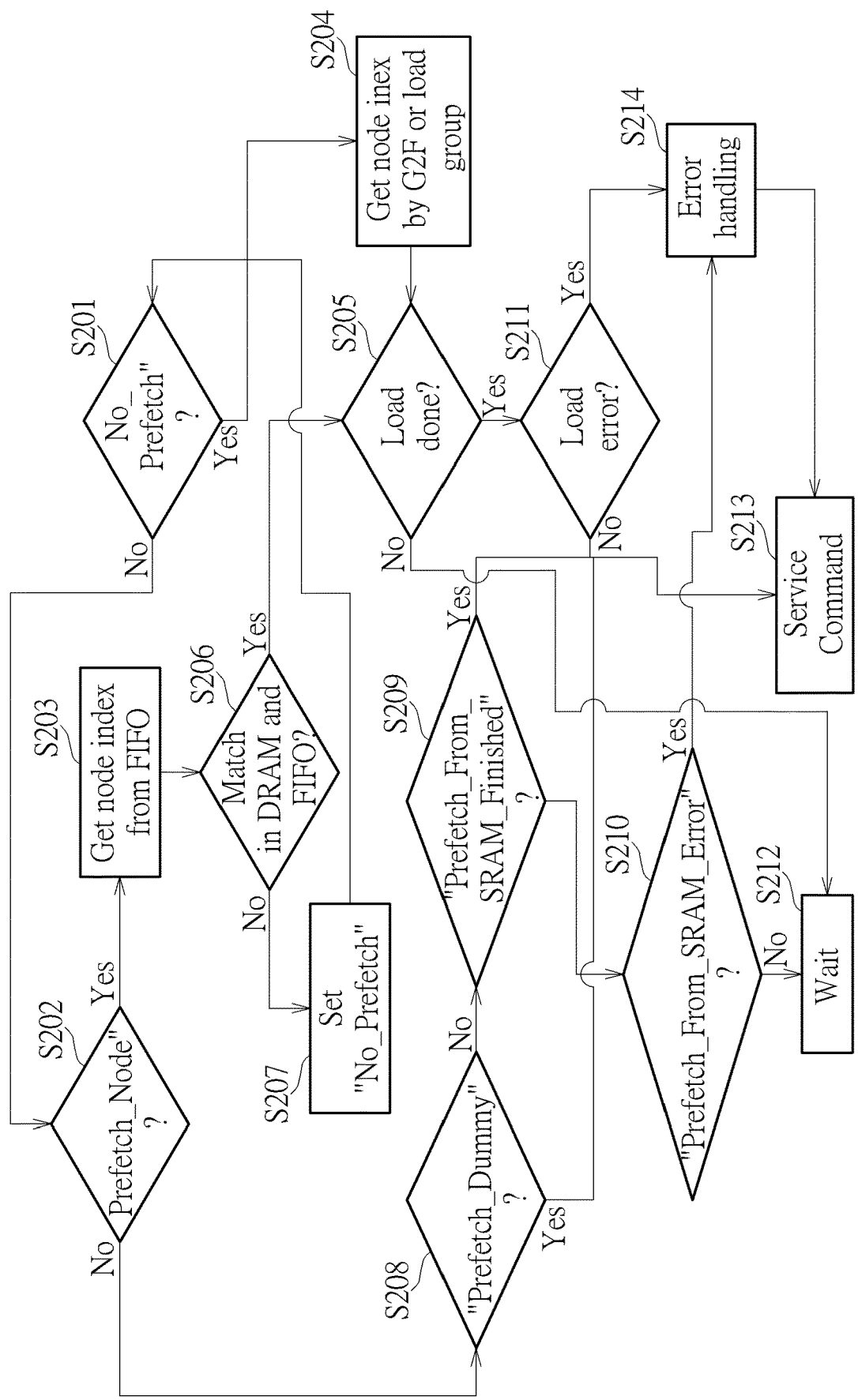
FIG. 6 illustrates a loading state checking phase for handling a host read/write command according to one embodiment of the present invention.

FIG. 6 illustrates a flow chart of the loading state checking phase according to one embodiment of the present invention. During the loading state checking phase, it will be checked that whether the required group of the L2P mapping table has been correctly loaded and cached in the internal memory 113 of the flash memory controller 110. As illustrated, the flow starts at step S201, where it is checked whether the loading state in request FIFO buffer 1132F is "No_Prefetch". If so, the flow goes to step S204; otherwise the flow goes to step S202. At step S202, it is checked whether the loading state in request FIFO buffer 1132F is "Prefetch_Node". If so, the flow goes to step S203; otherwise, the flow goes to step S208. At step S203, since the loading state in the request FIFO buffer 1132F is "Prefetch_Node", a processing core of the processing unit 112 could get the node index from the request FIFO buffer 1132F, determining which node of the second region 1131_2 of the DRAM 1131 the required group is stored in. After that, the flow proceeds to step S206. At step S206, it is checked the group indicated by the node index stored in the request FIFO buffer 1132F is identical to the group actually retain in the DRAM node. This is because internal operations of the memory controller 110, such as, garbage collection, will lead to inconsistency between indexing information in the request FIFO buffer 1132F and group stored in the DRAM node. These, it is necessary to confirm that group indicated by the node index is identical to the group actually retain in the DRAM node.

If the check result of step S206 is yes, the flow goes to step S205; otherwise the flow goes to step S207. At step S204, as the loading state in request FIFO buffer is "No_Prefetch", a node index will be obtained by referencing the G2F mapping table if the required group has been loaded to the DRAM 1131. Otherwise, a command for loading the required group loading will be issued, which allows the required group of the L2P mapping table to be loaded from the NV flash memory 120 the second region 1131_2 of the DRAM 1131. After step S204 is completed, the flow goes to step S205. At step S205, since the group in the DRAM node does match the group indicated by the node index in the request FIFO buffer 1132F, it is further checked whether loading group to the second region 1131_2 of the DRAM 1131 is done. If the check result of step S205 is yes, the flow goes to step S210; otherwise, the flow goes to step S214. At step S207, as the group in the DRAM node indicated by the node index fails to match the required group in the request FIFO buffer 1132F, the loading state in the request FIFO buffer will be set as "No_Prefetch". After that, the flow returns back to step S201.

At step S208, it is checked whether the loading state in the request FIFO buffer 1132F is "Prefetch_Dummy". If the check result of step S208 is yes, the flow goes to step S213; otherwise, the flow goes to step S209. At step S209, it is checked whether the loading state in the request FIFO buffer 1132F is "Prefetch_from_SRAM_Finished". As mentioned above, once the required group is loaded to the third region 1132_3 of the SRAM 1132, the loading state in the request FIFO buffer 1132F will be set as "Prefetch_from_SRAM_Finished". If so, the flow goes to step S213; otherwise, the flow goes to step S210. At step S210, it is further checked whether the loading state in the request FIFO buffer 1132F is "Prefetch_from_SRAM_Error". Specifically, during loading group from the NV memory 120, the another processing core that is responsible for loading the group of the L2P mapping table may encounter load error. If load error occurs, the another processing core may set the loading state in the request FIFO buffer 1132F as "Prefetch_from_SRAM_Error". If the check result of step S210 is no, this means there is no load error, the flow will suspend here until the required group of the L2P mapping table has been completely loaded. Meanwhile, the current processing core may start handling other tasks.

At step S210, it is checked whether there is a load error after node loaded. If the check result of step S210 is yes, the flow goes to step S212; otherwise, the flow goes to step S213. At step 211, as the loading state in the request FIFO buffer 1132F is not "Prefetch_from_SRAM_Finished", it is further checked whether the loading state in the request FIFO buffer 1132F is "Prefetch_from_SRAM_Error". If yes, the flow goes to step goes to step 212; otherwise, the flow goes to step 214. At step 212, since there is a load error after node loaded or the loading state in the request FIFO buffer 1132F is "Prefetch_From_SRAM_Error", an error handling process will be applied to correct the error. Accordingly, the flow will goes to step 213 if the error handling process has been completed. At step 213, the handling phase will end, and the flow proceeds to the command serving phase. At step 214, since the required group of the L2P mapping table has not been loaded completely, the flow will wait until it has been done.

Figure 7:
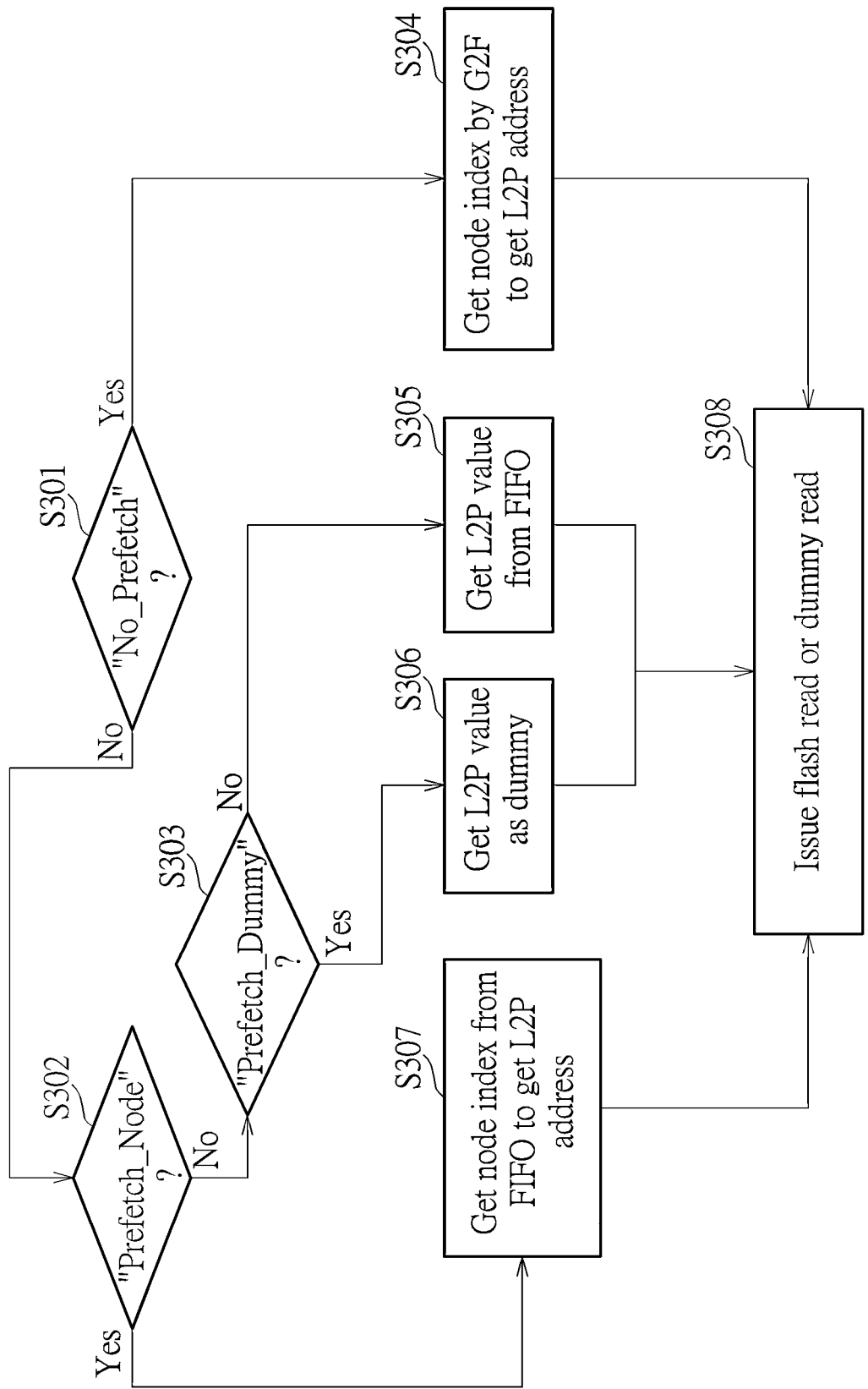
FIG. 7 illustrates a command serving phase for handling a host read command according to one embodiment of the present invention.

FIG. 7 illustrates a flow chart of the command serving phase for the host read command according to one embodiment of the present invention. During this phase, the read operation on the NV memory 120 will be performed according to the L2P address derived from the group of the L2P mapping table. As illustrated, the flow starts at step S301, wherein it is checked whether the loading state in the request FIFO buffer 1132F is "No_Prefetch". If so, the flow goes to step S304; otherwise, the flow goes to step 302. At step S302, it is checked whether the loading state of request FIFO buffer 1132F is "Prefetch_Node". If the check result of step S302 is yes, the flow goes to step S307; otherwise, the flow goes to step 303. At step S303, it is checked whether the loading state of the request FIFO buffer 1132F is "Prefetch_Dummy". If the check result of step S303 is yes, the flow goes to step S306; otherwise, the flow goes to step S305.

At step S304, as the loading state of request FIFO buffer 1132F is "No_Prefetch", the node index will obtained by checking the G2F mapping table. Accordingly, an L2P address corresponding to the host read command will be obtained from the DRAM 1131 by referencing the obtained node index. At step S305, since the loading state of request FIFO buffer 1132F is not "Prefetch_Dummy", this means the required group of the L2P mapping table should have been loaded to the third region 1132_3 of the shared SRAM 1132 by one processing core, and an L2P value associated with the host read command has been obtained by another processing core from the required group and stored into the request FIFO buffer 1132F. Hence, after the step S305, the L2P value associated with the host read command can be obtained from the request FIFO buffer 1132F. At step S306, since the loading state of the request FIFO buffer 1132F is "Prefetch_Dummy", the processing core would get the L2P value as dummy.

At step S307, since the loading state of request FIFO buffer is "Prefetch_Node", a node index will be obtained from the request FIFO buffer 1132F. According to the obtained node index, an L2P address associated with the host read command can be obtained from the second region 1131_2 of the DRAM 1131 indicated by the node index. After step S304, S305, S306 or S307 has been completed, the flow goes to step S308, where a read operation on the NV memory 120 will be performed by issuing a flash read command to the NV memory 120 or a dummy read will be performed (i.e., reporting a null value to the host device 50).

Figure 8:
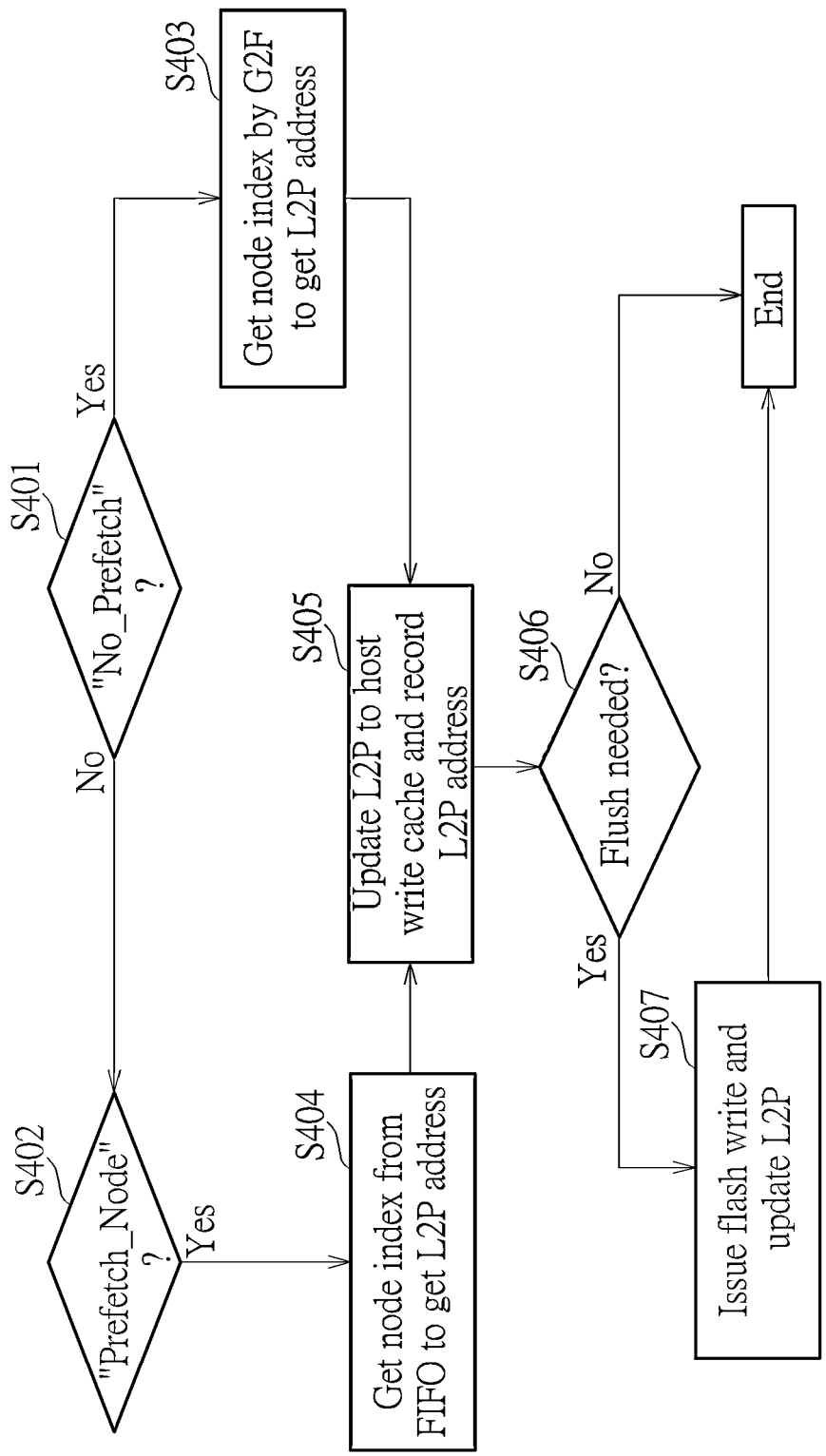
FIG. 8 illustrates a command serving phase for handling a host write command according to one embodiment of the present invention.

FIG. 8 illustrates a flow chart of the command serving phase for a host write command according to one embodiment of the present invention. As illustrated, the flow starts at step S401, wherein it is checked whether the loading state of the request FIFO buffer 1132F is "No_Prefetch". If the check result of step 401 is yes, the flow goes to step S403; otherwise, the flow goes to step 402. At step S402, it is checked whether the loading state of the request FIFO buffer 1132F is "Prefetch_Node". If the check result of step S402 is yes, the flow goes to step S404. At step S403, since the loading state of the request FIFO buffer 1132F is "No_Prefetch", a node index will be obtained by referencing the G2F mapping table. Accordingly, an L2P address corresponding to the host write command can be obtained from the second region 1131_2 of the DRAM 1131 by referencing the node index. At step S404, since the loading state of the request FIFO buffer 1132F is "Prefetch_Node", a node index can be obtained by from the request FIFO buffer 1132F and an L2P address corresponding to the host write command will be obtained from the DRAM 1131 by referencing the node index.

After the step S403 or S404 has been completed, the L2P address of the host write command has been obtained, and the flow proceeds to step S405. At step S405, a processing core of the processing unit 112 updates an L2P address of host write data according to an address of the second region 1132_2 of the shared SRAM 1132 the host write data is stored. As illustrated by FIG. 4, once one unit of the host write data (e.g. Unit_0-Unit_y) is cached in the second region 1132_2 of the shared SRAM 1132, its corresponding L2P address (e.g. Addr_0-Addr_y) will be cached in an L2P address array that is stored in the first region 1132_1 of the shared SRAM 1132. Accordingly, the L2P addresses of the host write data will be updated according to physical addresses of the second region 1132_2 of the shared SRAM 1132 the host write data is stored at.

After that, the flow goes to step S406, checking whether host write cache (i.e., the second region 1132_2 of the shared SRAM 1132) needs to be flushed. That is, if the host write cache is full or the host device 50 sends a cache flushing command, the host write data will be programmed to the NV memory 120. If so, the flow goes to step S407, wherein a write operation on the NV memory will be performed and thus the host write data cached in the second region 1132_2 of the shared SRAM 1132 will be programmed to the NV memory 120 by issuing a flash write command to the NV memory 120. Accordingly, the L2P addresses of the host write data that are cached in the L2P address array needs to be updated according to new physical addresses of the NV memory 120 the host write data is programmed to.

Figure 9:
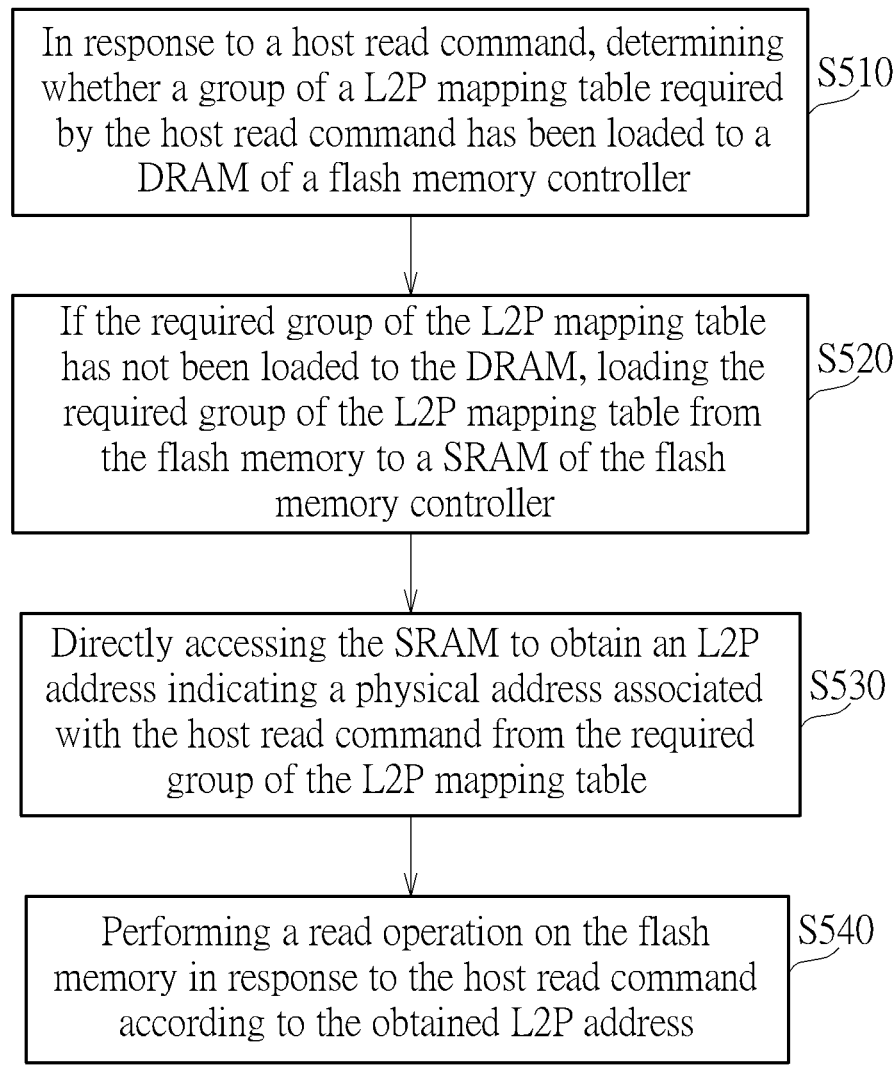
FIG. 9 illustrates a flowchart of loading and caching address mapping information in response to a host read command according to one embodiment of the present invention.

FIG. 9 illustrates a method of loading and caching address mapping information according to one embodiment of the present invention. As shown in the figure, the method of the present invention includes the following simplified flow:

S510: in response to a host read command, determining whether a group of a L2P mapping table required by the host read command has been loaded to a DRAM of a flash memory controller;

S520: If the required group of the L2P mapping table has not been loaded to the DRAM, loading the required group of the L2P mapping table from the flash memory to a SRAM of the flash memory controller;

S530: Directly accessing the SRAM to obtain an L2P address indicating a physical address associated with the host read command from the required group of the L2P mapping table; and S540: Performing a read operation on the flash memory in response to the host read command according to the obtained L2P address.

Since principles and specific details of the foregoing steps have been explained in detail through the above embodiments, further descriptions will not be repeated here. It should be noted that the above flow may be possible, by adding other extra steps or making appropriate modifications and adjustments, to better realize the image compression and further improve the compression quality and efficiency. Furthermore, all the operations set forth in the above embodiments can be implemented by the memory controller 110 shown in FIG. 1.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of caching mapping table for use in a flash memory device, the flash memory device including a flash memory controller and a flash memory, the method comprising:
  receiving a first host read command requiring loading of only one group of a logical-to-physical (L2P) mapping table, where the required group has not been loaded to a dynamic random access memory (DRAM);
  receiving a second host read command requiring loading of more than one group of a L2P mapping table;
  for each received host read command, determining whether only one group of the L2P mapping table is required to handle the host read command;
  for the first host read command:
    determining the required group of the L2P mapping table has not been loaded to the DRAM;
    in response to determining that only one group of the L2P mapping table is required to handle the first host read command and the required group of the L2P mapping table has not been loaded to the DRAM, loading the required group of the L2P mapping table from the flash memory to a static random access memory (SRAM) of the flash memory controller;
    directly accessing the SRAM to obtain one or more L2P addresses indicating one or more physical addresses associated with the first host read command from the required group of the L2P mapping table;
  for the second host read command:
    in response to determining that more than one group of the L2P mapping table is required to handle the second host read command, loading the more than one group of the L2P mapping table from the flash memory to the DRAM;
    accessing the DRAM to obtain one or more L2P addresses indicating one or more physical addresses associated with the second host read command from the more than one group of the L2P mapping table;
  performing read operations on the flash memory in response to the first and the second host read commands according to the obtained one or more L2P addresses.

2. The method of claim 1, wherein the step of directly accessing the SRAM to obtain the L2P address comprises:
  for the first host read command, loading L2P mapping information from the required group of the L2P mapping table from the SRAM to an L2 cache of the flash memory controller without loading the required group to the DRAM.

3. The method of claim 1, further comprising:
  receiving a third host read command requiring loading of only one group of the L2P mapping table;
  for the third host read command:
    determining that the required group of the L2P mapping table has been loaded to the DRAM;
    obtaining a node index indicating which memory node of the DRAM the required group is stored by referencing a group-to-flash (G2F) mapping table; and
    obtaining the one or more L2P addresses indicating a physical address associated with the third host read command from the required group of the L2P mapping table stored in a memory node of the DRAM indicated by the node index.

4. The method of claim 1, wherein the step of loading the required group of the L2P mapping table from the flash memory to the SRAM comprises:
  loading the required group of the L2P mapping table from the flash memory to a first region of the SRAM; and
  the step of directly accessing the SRAM to obtain the one or more L2P addresses comprises:
    reading the one or more L2P addresses from the required group in the first region of the SRAM and then storing the one or more L2P addresses into a First-In, First-Out (FIFO buffer) buffer allocated on a second region of the SRAM; and
    obtaining the one or more L2P addresses from the FIFO buffer.

5. The method of claim 1, further comprising:
  referencing a group-to-flash (G2F) mapping table to determine whether the required group is dummy; and
  reporting a null value in response to the first host read command if the required group is dummy.

6. A flash memory controller configured to access a flash memory, comprising:
  a storage unit, configured to store information and program codes;
  a dynamic random access memory (DRAM);
  a static random access memory (SRAM);
  a processing unit, operable to execute the program codes to be configured to:
    in response to a host read command, determine whether only one group of a logical-to-physical (L2P) mapping table is required to handle the host read command and whether the required group of the L2P mapping table has been loaded to the DRAM;
    if only one group of the L2P mapping table is required to handle the host read command and the required group has not been loaded to the DRAM, load the required group of the L2P mapping table from the flash memory to the SRAM;

directly access the SRAM to obtain one or more L2P addresses indicating one or more physical addresses associated with the host read command from the required group of the L2P mapping table; and perform a read operation on the flash memory in response to the host read command according to the obtained one or more L2P addresses; and wherein the processing circuit is further configured to load more than one group of the L2P mapping table from the flash memory to the DRAM if the more than one group of the L2P mapping table is required to handle the host read command.

7. The controller of claim 6, wherein the processing circuit is configured to load L2P mapping information from the required group of the L2P mapping table from the SRAM to an L2 cache of the flash memory controller without loading the required group to the DRAM.

8. The controller of claim 6, wherein the processing circuit is configured to:

determine whether the required group of the L2P mapping table has been loaded to the DRAM;

obtain a node index indicating a node of DRAM on which the required group is stored by referencing a group-to-flash (G2F) mapping table if the required group of the L2P mapping table has been loaded to the DRAM; and obtain the one or more L2P addresses indicating a physical address associated with the host read command from the required group of the L2P mapping table stored in a memory node of the DRAM indicated by the node index.

9. The controller of claim 6, wherein the processing circuit is configured to:

load the required group of the L2P mapping table from the flash memory to a first region of the SRAM; and read the one or more L2P addresses from the required group in the first region of the SRAM and then storing the one or more L2P addresses into a First-In, First-Out (FIFO buffer) buffer allocated on a second region of the SRAM; and obtain the one or more L2P addresses from the FIFO buffer.

10. The controller of claim 1, wherein the processing circuit is configured to:

reference a group-to-flash (G2F) mapping table to determine whether the required group is dummy; and report a null value in response to the host read command if the required group is dummy.

* * * * *